US012798945B2

(12) United States Patent
Daley

(10) Patent No.: US 12,798,945 B2
(45) Date of Patent: Nov. 17, 2026

(54) AUTOMATIC TOOL TILT COMMAND SYSTEM

(71) Applicant: DANFOSS POWER SOLUTIONS INC., Ames, IA (US)

(72) Inventor: Christian S. Daley, Ames, IA (US)

(73) Assignee: Danfoss Power Solutions Inc, Ames, IA (US)

(*) Notice: Subject to any disclaimer, the term of this patent is extended or adjusted under 35 U.S.C. 154(b) by 0 days.

(21) Appl. No.: 18/956,648

(22) Filed: Nov. 22, 2024

(65) Prior Publication Data

US 2025/0074758 A1 Mar. 6, 2025

Related U.S. Application Data

(63) Continuation-in-part of application No. 16/934,116, filed on Jul. 21, 2020, now abandoned.

(60) Provisional application No. 62/876,905, filed on Jul. 22, 2019.

(51) Int. Cl.

*B66F 9/22* (2006.01)
*B66F 9/16* (2006.01)
*E02F 9/20* (2006.01)

(52) U.S. Cl.

CPC .................. *B66F 9/22* (2013.01); *B66F 9/16* (2013.01); *E02F 9/2037* (2013.01)

(58) Field of Classification Search

None

See application file for complete search history.

(56) References Cited

U.S. PATENT DOCUMENTS

| | | | | |
|---|---|---|---|---|
| 5,701,793 A * | 12/1997 | Gardner | E02F 9/2025 60/426 |
| 6,185,493 B1 * | 2/2001 | Skinner | E02F 9/2033 701/50 |
| 6,757,994 B1 * | 7/2004 | Hendron | E02F 3/432 701/50 |
| 8,500,387 B2 * | 8/2013 | Trifunovic | E02F 3/432 701/50 |
| 8,886,415 B2 * | 11/2014 | Shatters | E02F 3/436 414/815 |
| 9,249,555 B2 * | 2/2016 | Reedy | E02F 9/2228 |
| 2005/0210713 A1 * | 9/2005 | Mennen | B25J 9/1628 37/348 |
| 2012/0255293 A1 | 10/2012 | Reedy | |

* cited by examiner

*Primary Examiner* — Hunter B Lonsberry
*Assistant Examiner* — Robert L Pinkerton
(74) *Attorney, Agent, or Firm* — ZarleyConley

(57) ABSTRACT

An automatic tool tilt command system for a boom moveably connected with one end to a chassis of a working machine, wherein a tiltable tool is attachable to the other end. A first electronic control valve for controlling a fluid flow to and from a lift cylinder for moving the boom and a second electronic control valve for controlling a fluid flow to and from a tilt cylinder for tilting the tool. A control unit receives signals to move the boom and transmits signals to the first electronic control valve in order to move the boom. In parallel the control unit transmits signals to the second electronic control valve which are based on a predetermined fluid flow ratio defined by the fluid flow for the boom movement and the fluid flow for tool levelling, so that the tool maintains its inclination angle with respect to the horizontal.

10 Claims, 2 Drawing Sheets

AUTOMATIC TOOL TILT COMMAND SYSTEM

CROSS REFERENCE TO RELATED APPLICATION

This application is a continuation-in-part of U.S. patent application Ser. No. 16/934,116, filed Jul. 21, 2020, now abandoned, which claims the benefit of U.S. Provisional Patent Application No. 62/876,905, filed on Jul. 22, 2019, each of which is incorporated by reference herein in its entirety.

BACKGROUND OF THE INVENTION

This disclosure generally relates to an automatic tool tilt command system. More specifically, the disclosure relates to an automatic tool tilt command system, e.g., for a telehandler, that eliminates a compensation cylinder or an angle sensor and feedback signals for compensating change in the angle between a boom and a tool attached thereto when the boom is lifted or lowered and in order to keep the inclination angle of the tool with respect, e.g., to the horizontal or vertical direction stable.

Forklifts, and in particular telehandler forklifts, are well-known in the art and are used to lift and move materials over short distances. Forklifts have become an indispensable piece of equipment in manufacturing and warehousing. Forklifts are rated for loads at a specified maximum weight and a specified forward center of gravity. Loads must not exceed these specifications.

One critical characteristic of a forklift is its instability. The forklift and load must be considered a unit with a continually varying center of gravity with every movement of the working machine and the load, in particular with telehandlers as the boom is moveable in a telescopic manner also, thereby increasing the lever arm of the load. A forklift must never negotiate a turn at speed with a raised load, where centrifugal and gravitational forces may combine to cause a disastrous tip-over accident. The forklift is designed with a load limit for the forks which is decreased with fork elevation and undercutting of the load (i.e., when a load does not butt against the fork "L"). A loading plate for loading reference is usually located on the forklift.

As a critical element of warehouses and distribution centers, it is imperative that a forklift's structure be designed to accommodate for efficient and safe movement. In addition to a control to raise and lower the forks (also known as blades or tines) or other tools, the operator can tilt the mast, e.g. of a warehouse forklift, to compensate for a load's tendency to angle the blades toward the ground and risk slipping off the forks. For this purpose working machines comprise a hydraulic cylinder for moving the boom/mast with respect to the chassis of the working machine, e.g. for raising or lowering the load, and a tilt cylinder to keep the load in the desired inclination, e.g. in the horizontal position. The boom moving/lifting cylinder is attached with one end to the chassis and with its other end to the boom. At the other end of the boom, between the "free end" of the boom and the tool, e.g. a fork, a tilt cylinder is located for setting/adjusting the tilt/inclination of the tool with respect to an absolute direction, e.g. the horizontal or the vertical direction.

In order to maintain the inclination/tilt of the fork/tool stable during operation of the working machines, these working machines, e.g. a telehandler, comprise a tilt compensation system. Such a usually hydraulically driven tilt compensation system ensures the inclination angle of the fork with respect to the horizontal stable when the boom is raised or lowered, extended or retracted in the (telescopic) longitudinal direction. Tilt compensation also provides for an ability to operate on uneven ground. Such a tilt or inclination compensation system applies in all working machines in which an orientation/inclination of the tool has to be kept constant during operation of the working machine, be it a fork for material handling or a shovel for loading gravel onto a lorry, or in case of an earth drilling machine, to maintain the drilling angle constant.

Presently in the state of the art, tilt compensation cylinders are used to keep the tool inclination with respect to the horizontal or vertical when the boom of a telehandler is raised and lowered. Such a tilt compensation cylinder is mechanically linked and designed to extend and retract as the lift/moving cylinder for the boom is extended or retracted when the boom is commanded, e.g. by an operator, to raise, to lower, to extend, or to retract. The compensation cylinder then enables a compensation fluid flow to the tilt cylinder in order to maintain the fork inclination stable.

U.S. Patent Publication 2012/0255293 A1 discloses a hydraulic system for a mobile machine capable of levelling a tool. The hydraulic system comprises two hydraulic actuators which are each operated by a valve operation. The hydraulic system additionally comprises an operator interface device moveable to generate input commands to a controller which controls the valve arrangements to conduct hydraulic fluid into the working chambers of the actuators. The pressure compensation valves maintain a differential pressure between fluid passages towards the valve arrangement and supply passages from a hydraulic pump.

Other prior art, e.g., utilizes level sensors on the tool to keep it level or at some determined angle relative to the chassis or the absolute horizontal or vertical direction by feeding back signals to a control unit for tilt angle compensation by means of controlling a fluid flow to and from the tilt cylinder to retract or extend. The use of tilt compensation cylinders and level sensors, however, adds complexity and expense to the design and manufacture of current working machines equipped with a boom to which a tool is attached to, and whose inclination angle has to be controlled during operation of the working machine.

Creating a solution that does not use a tilt compensation cylinder nor a level sensor with feedback system but maintains current performance of the tilt cylinder is desired. Eliminating the compensation cylinder or sensors and feedback system provides an important cost savings to the overall working machine particularly when functionality is to be maintained.

Accordingly, an objective of the present invention is to provide an automatic tilt command system that eliminates the use of a tilt compensation cylinder and a level sensor.

Another objective of the present invention is to provide an automatic tilt command system that is less expensive to manufacture while machine functionality is maintained.

These and other aspects, features, and advantages of the invention will become apparent from the specification and claims.

SUMMARY OF THE INVENTION

The disclosure provides various aspects of an automatic tool tilt command system.

In some aspects, the techniques described herein relate to an automatic tool tilt command system including: a first electronic control valve for controlling a flow of hydraulic fluid to and from a lift cylinder for moving of a boom; a second electronic control valve for controlling the flow of the hydraulic fluid to and from a tilt cylinder for tilting a tool; and a control unit configured to receive an input command to move the boom; the control unit is configured to transmit a boom actuating signal to the first electronic control valve in order to move the boom, and to transmit in parallel a tool actuating signal to the second electronic control valve; wherein the boom actuating signal and the tool actuating signal are based on a predetermined flow ratio defined by the flow of the hydraulic fluid to move the boom and the flow of hydraulic flow to level the tool, such that the tool maintains an inclination angle with respect to a horizontal direction, wherein the control unit applies the predetermined flow ratio based on available hydraulic flow determined by a load sharing system of the control unit.

In some aspects, the techniques described herein relate to an automatic tool tilt command system, wherein the input command is transmitted via an input device by an operator.

In some aspects, the techniques described herein relate to an automatic tool tilt command system, wherein the first electronic control valve and the second electronic control valve are actuated by solenoids.

In some aspects, the techniques described herein relate to an automatic tool tilt command system, wherein at least one signal selected from a group consisting of an input signal, the boom actuating signal, and the tool actuating signal are transmitted with the control unit.

In some aspects, the techniques described herein relate to an automatic tool tilt command system, wherein the boom includes at least two boom elements which are movable relative to each.

In some aspects, the techniques described herein relate to an automatic tool tilt command system, wherein the boom is configured for telescopic extension and retraction.

In some aspects, the techniques described herein relate to an automatic tool tilt command system, wherein an inclination of the tool can be adjusted via an input device independent to the boom actuating signal.

In some aspects, the techniques described herein relate to an automatic tool tilt command system, further including, the boom moveably connected with one end to a chassis and with the tool attached at an opposite end, wherein a hydraulic system for providing the lift cylinder via the first electronic control valve and for providing the tilt cylinder via the second electronic control valve with hydraulic fluid flow is controlled by the control unit to provide sufficient fluid flow to both the lift cylinder and the tilt cylinder so that a predetermined fluid flow ratio is maintain to allow movement of the boom while maintaining an inclination of the tool with respect to the horizontal direction.

In some aspects, the techniques described herein relate to an automatic tool tilt command system including: a work machine having a chassis connected to a boom, a tool, and an input device; a lift cylinder connected to a hydraulic system and the boom; the hydraulic system having a first electronic control valve, wherein the first electronic control valve is configured to control a flow of a hydraulic fluid from the hydraulic system to the lift cylinder to control movement of the boom; a tool cylinder connected to the hydraulic system and the boom, wherein the tool cylinder is configured to move the tool; the hydraulic system having a second electronic control valve, wherein the second electronic control valve is configured to control the flow of the hydraulic fluid from the hydraulic system to the tool cylinder to control the movement of the tool; a control unit having a predetermined flow ratio and connected the hydraulic system, wherein the control unit is configured to transmit a boom actuating signal to the first electronic control valve and a tool actuating signal to the second electronic control valve such that the flow of the hydraulic fluid is changed; wherein, based on the predetermined flow ratio and an input command from the input device, the boom actuating signal and the tool actuating signal are contemporaneously transmitted by the control unit to maintain an inclination of the tool about a horizontal direction as the boom is moved.

In some aspects, the techniques described herein relate to an automatic tool tilt command system, further including the control unit having a load sharing system, wherein the load sharing system is configured to modify the boom actuating signal and the tool actuating signal to not exceed an operational capacity of the hydraulic system.

The solution to the above referenced problems involves, according to claim 1 of the invention, sending based on a command to move the boom automatically generated command signals to electronic control valves in order to permit hydraulic flow to and from the boom moving cylinder and to and from the tool tilt cylinder with a predetermined ratio. Thereby the predetermined ratio is determined by the design of the working machine as every boom movement requires a correspondent tilt compensation. With the movement of the boom the angle between the boom and the chassis of the working machine changes. In order to keep the inclination of the tool with respect to the horizontal or vertical constant the angle between the boom and the tool has to be changed as well. For instance, when the boom is raised an angle between the boom and the chassis increases, and thus an angle between the boom and the tool has to be reduced in order that the tool maintains its inclination with regard to the horizontal. This angle compensation requires a hydraulic fluid flow for tilt compensation and is a fixed percentage of the hydraulic fluid flow necessary for the boom movement. This percentage at least over large parts of the operational range of the boom movement remains more or less constant and can be determined by testing, mathematical calculation, or simulation. Hence, the predetermined ratio according to invention is a percentage between the fluid flow for boom movement and the fluid flow required for tilting the tool in order to keep the inclination of the tool with respect to an absolute direction constant.

For controlling these fluid flows for moving the boom and tilting the tool the invention uses for controlling each fluid flow an electronic control valve, which valves are controlled by a control unit providing correspondent electric signals for feeding or discharging hydraulic fluid to and from the moving cylinder of the boom and to and from the tilt cylinder for tilting the tool. This control unit is designed to receive the commands for moving the boom, to determine the correspondent fluid flows to both the moving/lift cylinder and the tilt cylinder based on the predetermined flow ratio as indicated above, and to transmit corresponding signals to the electronic control valves for permitting adequate fluid flows to and from the movements cylinder and to and from the tilt cylinder.

In difference to the state of the art neither a compensation cylinder nor sensors for feeding back the tool inclination is necessary any longer. Furthermore, existing control units can be used and have to be designed only in a manner that they are capable to transmit corresponding electric signals to the electronic control valves for adjusting the tool inclination to the movement of the boom. For these signal transmissions commonly known techniques are applicable as transmission by wire, wireless transmission, transmission by serial or parallel bus systems, etc.

Naturally, the electronic control valves have to be equipped with correspondent receivers for receiving the actuating signal to move the boom and the levelling signal to perform the tilt compensation. Here the electronic control valves, for instance, comprise electronic actuators, like solenoids to enable the commanded fluid flows to the respective cylinders in order to fulfil the initial operation input command to move/lift/lower the boom while keeping the inclination angle of the tool as initially adjusted.

As the cylinders for boom movement and for tool inclination are commonly double-acting cylinders, the use of ¾-way-valves is possible. Such directional valves comprise a spool for opening and closing the adequate fluid paths, preferable in a proportional manner corresponding to the actuation and/or the inclination signal. For doing this, solenoids can be applied, which shift the spool proportional to the actuation or levelling signal to enable the correspondent boom movement with tool inclination compensation. In order to bring or hold these electronic control valve in their initial position, where fluid flows via the electronic control valves is disabled, centring valve springs or pressure compensated valve spools can be used. Further, pressure compensated valves are used preferably, when load independent flow functionality should be provided by the inventive automatic compensation system for tool inclination.

Preferably a load sharing system of a control unit provides that there is always sufficient fluid flow available for both functions so that the predetermined flow ratio can be always maintained. Here the control unit preferably controls the hydraulic system of the working machine in order that the total pump flow commanded for the operation of all working machine functions does not exceed the actual pump flow output or the maximum capacity of the pump. Here pump speed, engine speed as well as pump and engine efficiencies should be considered. Hence the control unit for tilt compensation applies the predetermined flow ratio for tilt compensation based on available hydraulic flow determined by the load sharing unit.

In operation of the working machine, e.g., the operator transmits via a joystick command to the control unit, e.g., for moving the boom only, while the inventive tilt compensation system adapts the angle of the tool automatically in order to maintain the tool inclination constant with respect to the horizontal, however, the operator is still able to make adjustments to the tilt function via a joystick. This means that the operator is capable to command only the tool tilt function without moving the boom. If the operators do not wish to change the tool inclination the inventive system corrects automatically the angle between the boom and the tool so that the tool stays level, for instance. For this new system to function correctly, it is preferred that the flow ratio of boom raise flow to tool tilt flow is very close to constant for all positions of the lift cylinder to keep the tool inclination constant, e.g. level.

The following invention is described exemplarily by the help of a telehandler equipped with a tiltable tool, e.g. a fork, for moving load, e.g. material on pallets from one place to another. However, the invention is not limited thereto and, e.g., applies also to tractors, excavators and other working machines equipped with a boom and a tiltable tool attached to the free end of the boom, for instance a road loader equipped with a fork, a bucket or a shovel. Another application example for the inventive tilt command system would be an earth drilling machine where the angle between the boom and the auger changes continuously during the drilling operation, however the drilling direction has to be maintained always. In all these applications the control of the angle between the boom and the tool, i.e. the inclination of the fork, the bucket, the shovel, or the auger has to be controlled and eventually adjusted in order that the tool inclination is kept stable with regard to absolute directions, as the horizontal or the vertical direction, even when the angle of the boom with respect to the chassis of the working machine is changing, e.g. when lifting the load or advance drilling.

This has outlined, rather broadly, the features, advantages, solutions, and benefits of the disclosure in order that the description that follows may be better understood. Additional features, advantages, solutions, and benefits of the disclosure will be described in the following. It should be appreciated by those skilled in the art that this disclosure may be readily utilized as a basis for modifying or designing other structures and related operations for carrying out the same purposes of the present disclosure. It should also be realized by those skilled in the art that such equivalent constructions and related operation do not depart from the teachings of the disclosure as set forth in the appended claims. The novel features, together with further objects and advantages, will be better understood from the following description when considered in connection with the accompanying Figures. It is to be expressly understood, however, that each of the Figures is provided for the purpose of illustration and description only and is not intended as a definition of the limits of the present disclosure.

DETAILED DESCRIPTION

Figure 1:
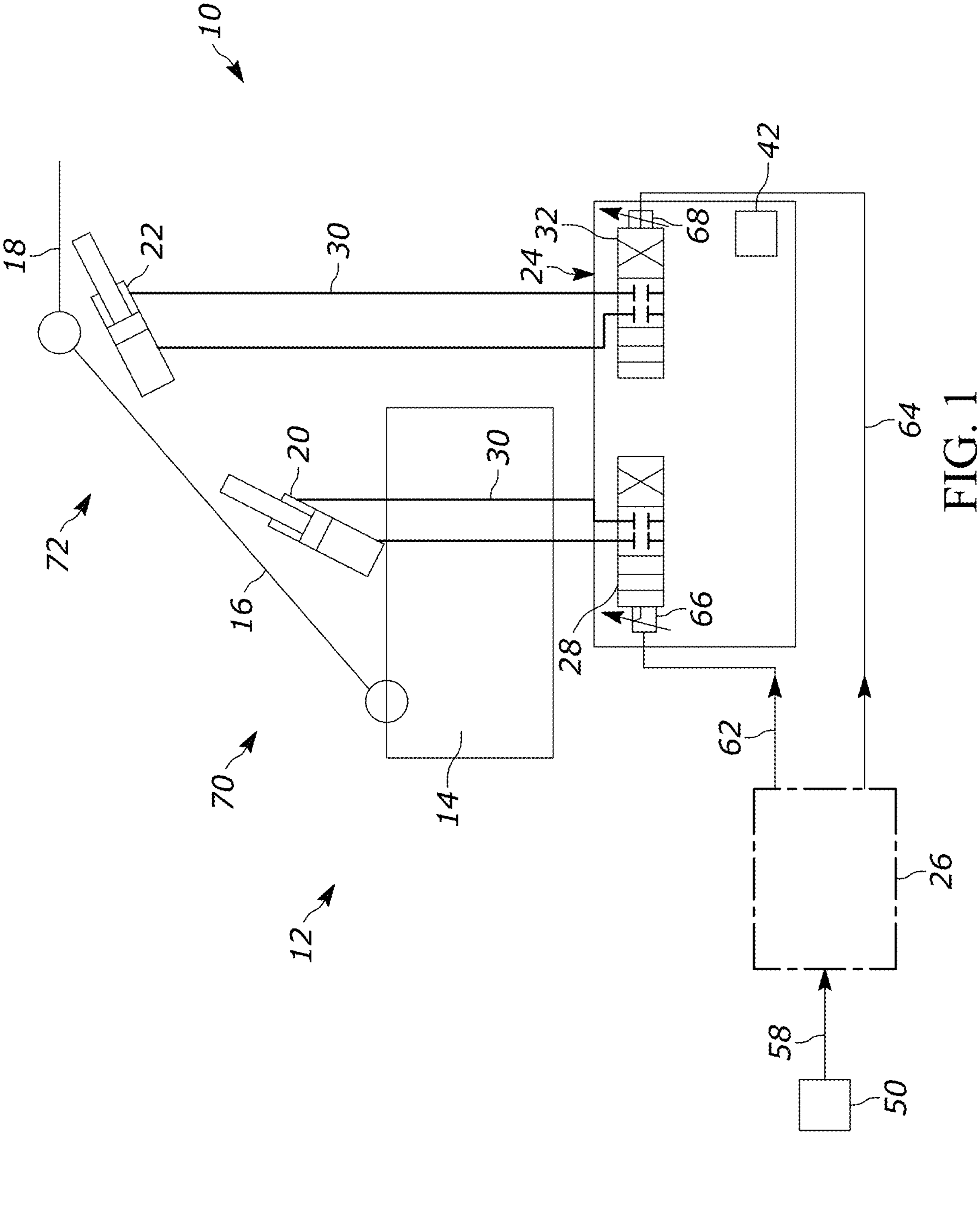
FIG. 1 is a schematic view of a first embodiment of an automatic tilt command system according to the invention.

The disclosure described herein is directed to different aspects of an automatic tool tilt command system. The detailed description set forth below, in connection with the appended drawings, is intended as a description of various configurations and is not intended to represent the only configurations in which the concepts described herein may be practiced. These descriptions include specific details for the purpose of providing a thorough understanding of the various concepts. It will be apparent, however, to those skilled in the art that these concepts may be practiced without these specific details. In some instances, well-known structures and components are shown in block diagram form in order to avoid obscuring such concepts. As described herein, the use of the term "and/or" is intended to represent an "inclusive OR", and the use of the term "or" is intended to represent an "exclusive OR".

Although the terms first, second, etc. may be used herein to describe various elements or components, these elements or components should not be limited by these terms. These terms are only used to distinguish one element or component from another. Hence, a first element discussed herein could be termed a second element without departing from the teachings of the present application. It is understood that actual systems or fixtures embodying the disclosure can be arranged in many different ways with many more features and elements beyond what is shown in the drawings. For the same or similar elements or features, the same reference numbers may be used throughout the disclosure.

The disclosure is described herein with reference to certain aspects, iterations, embodiments, and examples but it is understood that the disclosure can be embodied in many different forms and should not be construed as limited to the aspects set forth herein. In particular, the disclosure is described herein with respect to a telehandler, but it is understood that the disclosure can apply to a variety of work machines having a variety of tools, including a fork, a shovel, a grapple, a breaker, an auger, and/or the like that connect and/or are swappable on a telehandler, nan excavator and/or a drilling machine.

It is to be understood that when an element or component is referred to as being "on" another element or component, it can be directly on the other element or intervening elements may also be present. Furthermore, relative terms such as "between", "within", "below", and similar terms, may be used herein to describe a relationship of one element or component to another. It is understood that these terms are intended to encompass different orientations of the disclosure in addition to the orientation depicted in the figures.

Aspects of the disclosure may be described herein with reference to illustrations that are schematic illustrations. As such, the actual thickness of elements can be different, and variations from the shapes of the illustrations as a result, for example, of manufacturing techniques and/or tolerances are expected. Thus, the elements illustrated in the figures are schematic in nature and their shapes are not intended to illustrate the precise shape of a region of a device and are not intended to limit the scope of the disclosure.

With reference to FIG. 1, aspects of an automatic tool tilt command system 10 are shown according to the disclosure. The automatic tool tilt command system 10 comprises one or more of a work machine 12 having a chassis 14 to which a boom 16 and a tool 18, such as a fork, are moveably and operatively connected. The work machine 12 may also comprise a lift cylinder 20 configured to raise and lower the boom 16. The work machine 12 may further comprise a tilt cylinder 22 configured to set and/or adjust the inclination of the tool 18 with respect to the horizontal direction, i.e., a plane extending parallel to a planar horizontal surface. The tilt cylinder 22 may be configured to adjust the inclination of the tool 18 during the movement of the boom 16 as described. The lift cylinder 20 and/or the tilt cylinder 22 may connect to and extend between the chassis 14 and the boom 16 and the tool 18, respectively.

In other aspects, the automatic tool tilt command system 10 may comprise the work machine 12 having a hydraulic system 24 operatively and communicatively connected to a controller or control unit 26. The hydraulic system 24 may comprise a first electronic control valve 28 configured to control the flow of a hydraulic fluid 30 between the hydraulic system 24 and the lift cylinder 20. The hydraulic system 24 may comprise a second electronic control valve 32 configured to control the flow of the hydraulic fluid 30 between the hydraulic system 24 and the tilt cylinder 22. The first electronic control valve 28 and the second electronic control valve 32 may be operatively and communicatively connected to the control unit 26. In certain aspects, the first electronic control valve 28 and/or the second electronic control valve 32 are pressure compensated valves.

The hydraulic system 24 may further comprise one or more of a pump 34 (not shown), a motor 36 (not shown), a conduit 38 (not shown) that may have a valve 40 (not shown). In other aspects, the hydraulic system 24 comprises a system capacity sensor or a plurality of system capacity sensors 42 configured to detect and directly or determinatively transmit to the control unit 26 operational conditions of the hydraulic system 24 comprising an available hydraulic flow, pump speed, engine speed, pressure, temperature, and the like, but which excludes a levelling sensor configured to determine the level of the tool 18 with respect to the horizontal direction.

Figure 2:
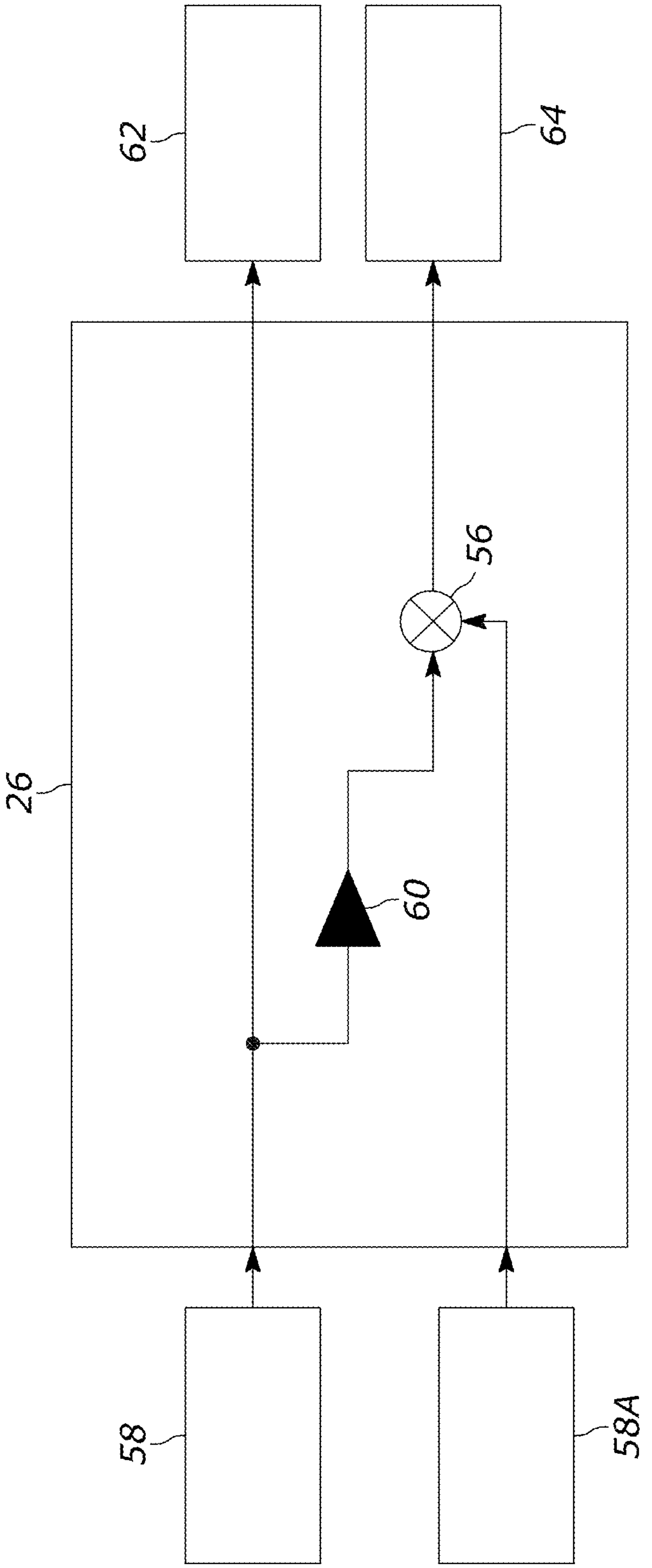
FIG. 2 is a schematic view of a second embodiment of an automatic tilt command system according to the invention.

With reference to FIGS. 1 and 2, the control unit 26 may comprise one or more of a processor 44 (not shown), a memory 46 (not shown), and a communication device 48 (not shown), such as one or more of a wired device (e.g., Ethernet or bus system) and/or wireless device (such a near field communication device (e.g., Bluetooth®)), configured to received signals from the plurality of system capacity sensors 42 and/or an input device 50, such as joystick used by an operator 52 (not shown). The memory 46 may contain one or more of a software 54 (not shown) that may include a load sharing system 56 as depicted in the exemplar of FIG. 2 and which is described further herein.

With reference to FIG. 2, the load sharing system 56 is configured to automatically adapt the input command 58, and therefore the boom actuating signal 62 and/or tool actuating signal 64, for moving the boom 16 to not exceed an operational capacity of the hydraulic system 24 of the work machine 12. In certain aspects, the system capacity sensor 42 is configured to detect or determine the pump speed and/or engine speed of the hydraulic system 24 and to transmit such information to the control unit 26. Accordingly, load sharing system 56 is configured to always result in boom actuating signal 62 and/or tool actuating signal 64 being transmitted by the control unit 26 to permit the predetermined flow ratio 60 for compensation of the inclination of the tool 18 during movement of the boom 16. In some circumstances, the load sharing system 56 may result in the speed in which the movement of the boom 16 and the inclination of the tool 18 is performed. The operator 52 may still adjust the tilt of tool 18 with the input device 50

With reference to FIGS. 1 and 2, in an exemplary operation, an input command 58 to modify the position of the boom 16 is transmitted to the control unit 26 by the operator 52 using the input device 50. Based on the input command 58 and a predetermined flow ratio 60 stored in the control unit 26, the control unit 26 calculates a flow of the hydraulic fluid 30 required to lift the lift cylinder 20 as commanded by the operator 52 and the hydraulic fluid 30 required for the tilt cylinder 22 to contemporaneously maintain the inclination of the tool 18 with regard to the horizontal direction. The predetermined flow ratio 60 may differ depending on the input command 58, the capacity of the hydraulic system 24, and/or the pre-existing position of the boom 16 and/or the tool 18. Using the calculation, the control unit 26 transmits in parallel a boom actuating signal 62 to the first electronic control valve 28 and a tool actuating signal 64 to the second electronic control valve 32 to command each, respectively, to permit the calculated flow of hydraulic fluid 30 from the hydraulic system 24 to the lift cylinder 20 and the tilt cylinder 22 to move the boom 16 as commanded by the operator 52 while maintaining the inclination of the tool 18 with regard to the horizontal direction. In other aspects, the boom actuating signal 62 is transmitted from the control unit 26 to a lift actuator 66 that actuates the first electronic control valve 28 and the tool actuating signal 64 to a levelling actuator 68 that actuates the second electronic control valve 32. The lift actuator 66 and/or the levelling actuator 68 may be solenoid actuators (i.e., solenoids).

As disclosed, the control unit 26 generates and transmits parallel signals to compensate for changes to the inclination of the tool 18 that would occur when the position of the boom 16 is modified absent such compensation. The prior art, in contrast, uses compensation cylinders or sensors which feedback a change of tilt angle, and which require correction after the fact to prevent a load from dislodging and/or falling from the tool 18.

With reference to FIGS. 1 and 2, the operator 52 may adjust the inclination of the tool 18 using the input device 50, which is transmitted to the control unit 26 with the input command 58 and/or a second input command 58A. In this way, the operator 52 can manually modify the tool 18 according to operational requirements for the work machine 12 or to make modifications to the inclination of the tool 18 based on visual observations. To this effect, the automatic tool tilt command system 10 is an open loop control system.

In still other aspects, the boom 16 is comprised of a first element 70 and a second element 72 that may be telescopically connected to one another. In such aspects, the boom 16 may be raised or lowered by the lift cylinder 20, including by way of retraction or extension in a longitudinal direction telescopically, which is commanded by the control unit 26 to a second lift cylinder 74 (not shown) in accordance with the disclosure herein. The automatic tool tilt command system 10, likewise, is capable of operation of the boom 16 that is foldable.

For a firmware and/or software implementation, the methodologies may be implemented with modules (e.g., procedures, functions, routines and so on) that perform the functions described herein. A machine-readable medium tangibly embodying instructions may be used in implementing the methodologies described herein. For example, software codes may be stored in a memory and executed by a processor unit. Memory may be implemented within the processor unit or external to the processor unit. As used herein, the term "memory" refers to types of long term, short term, volatile, nonvolatile, or other memory and is not to be limited to a particular type of memory or number of memories, or type of media upon which memory is stored. If implemented in firmware and/or software, the functions may be stored as one or more instructions or code on a computer-readable medium. Examples include computer-readable media encoded with a data structure and computer-readable media encoded with a computer program. Computer-readable media includes physical computer storage media. A storage medium may be an available medium that can be accessed by a computer. By way of example, and not limitation, such computer-readable media can include RAM, ROM, EEPROM, CD-ROM or other optical disk storage, magnetic disk storage, solid state or other magnetic storage devices, or other medium that can be used to store desired program code in the form of instructions or data structures and that can be accessed by a computer; disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media. In addition to storage on computer readable medium, instructions and/or data may be provided as signals on transmission media included in a communication apparatus. For example, a communication apparatus may include a transceiver having signals indicative of instructions and data. The instructions and data are configured to cause one or more processors to implement the functions outlined in the claims.]

Therefore, an automatic tool tilt command system 10 has been provided that does not use a tilt compensation cylinder nor a level sensor with feedback system but maintains current performance of the tilt cylinder, provides cost savings to the overall working machine particularly when functionality is to be maintained, and improves upon the art.

From the above discussion and accompanying figures and claims it will be appreciated that the automatic tool tilt command system 10 offers many advantages over the prior art. Although the present disclosure and its advantages have been described in detail, it should be understood that various changes, substitutions, modifications, and alterations can be made herein without departing from the technology of the disclosure as defined by the appended claims. The scope of the present application is not intended to be limited to the particular configurations of the process, machine, manufacture, composition of matter, means, methods and steps described in the specification only expressly stated otherwise. As one of ordinary skill in the art will readily appreciate from the disclosure, processes, machines, manufacture, compositions of matter, means, methods, or steps, presently existing or later to be developed that perform substantially the same function or achieve substantially the same result as the corresponding configurations described herein may be utilized according to the present disclosure. Accordingly, the appended claims are intended to include within their scope such processes, machines, manufacture, compositions of matter, means, methods, or steps.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, and modules described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The steps of a method or algorithm described in connection with the disclosure may be embodied directly in hardware, in a software module executed by a processor, or in a combination of the two. A software module may reside in RAM, flash memory, ROM, EPROM, EEPROM, registers, hard disk, a removable disk, a CD-ROM, solid state storage, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal. In yet other aspects, the processor can be remote to the storage medium and accesses the storage medium through a linked connection.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can include RAM, ROM, EEPROM, CD-ROM or other optical disk storage, magnetic disk storage or other magnetic storage devices, solid state, or any other medium that can be used to carry or store specified program code means in the form of instructions or data structures and that can be accessed by a general-purpose or special-purpose computer, or a general-purpose or special purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

In the present disclosure, the processor may serve as a structure for computer-implemented functions as described herein because the function(s) described in one or more aspects of the present disclosure are coextensive with the processor itself. Further, such a processor may serve as structure for functions that may be achieved by a general-purpose computer without special programming, because the coextensive functions include receiving data, storing data, processing data, etc. Further, the present disclosure are removed from the abstract, and do not merely limit the use of an abstract idea to a particular technological environment. The present disclosure expands basic building blocks beyond the mere sum of the parts, at least for the reason that the present disclosure provides faster, more consistent, and more reliable results than obtainable with current methods and devices.

What is claimed is:

1. An automatic tool tilt command system comprising:

a first electronic control valve for controlling a flow of hydraulic fluid to and from a lift cylinder for moving of a boom;

a second electronic control valve for controlling the flow of the hydraulic fluid to and from a tilt cylinder for tilting a tool; and a control unit configured to receive an input command to move the boom;

the control unit is configured to transmit a boom actuating signal to the first electronic control valve in order to move the boom, and to transmit in parallel a tool actuating signal to the second electronic control valve;

wherein the boom actuating signal and the tool actuating signal are based on a predetermined flow ratio defined by the flow of the hydraulic fluid to move the boom and the flow of hydraulic flow to level the tool, such that the tool maintains an inclination angle with respect to a horizontal direction, wherein the control unit applies the predetermined flow ratio based on available hydraulic flow determined by a load sharing system of the control unit.

2. The automatic tool tilt command system of claim 1, wherein the input command is transmitted via an input device by an operator.

3. The automatic tool tilt command system of claim 1, wherein the first electronic control valve and the second electronic control valve are actuated by solenoids.

4. The automatic tool tilt command system of claim 1, wherein at least one signal selected from a group consisting of an input signal, the boom actuating signal, and the tool actuating signal are transmitted with the control unit.

5. The automatic tool tilt command system of claim 1, wherein the boom comprises at least two boom elements which are movable relative to each other.

6. The automatic tool tilt command system of claim 1, wherein the boom is configured for telescopic extension and retraction.

7. The automatic tool tilt command system of claim 1, wherein an inclination of the tool can be adjusted via an input device independent to the boom actuating signal.

8. The automatic tool tilt command system of claim 1, further comprising, the boom moveably connected with one end to a chassis and with the tool attached at an opposite end, wherein a hydraulic system for providing the lift cylinder via the first electronic control valve and for providing the tilt cylinder via the second electronic control valve with hydraulic fluid flow is controlled by the control unit to provide sufficient fluid flow to both the lift cylinder and the tilt cylinder so that a predetermined fluid flow ratio is maintain to allow movement of the boom while maintaining an inclination of the tool with respect to the horizontal direction.

9. An automatic tool tilt command system comprising:

a work machine having a chassis connected to a boom, a tool, and an input device;

a lift cylinder connected to a hydraulic system and the boom;

the hydraulic system having a first electronic control valve, wherein the first electronic control valve is configured to control a flow of a hydraulic fluid from the hydraulic system to the lift cylinder to control movement of the boom;

a tool cylinder connected to the hydraulic system and the boom, wherein the tool cylinder is configured to move the tool;

the hydraulic system having a second electronic control valve, wherein the second electronic control valve is configured to control the flow of the hydraulic fluid from the hydraulic system to the tool cylinder to control the movement of the tool;

a control unit having a predetermined flow ratio and connected the hydraulic system, wherein the control unit is configured to transmit a boom actuating signal to the first electronic control valve and a tool actuating signal to the second electronic control valve such that the flow of the hydraulic fluid is changed;

wherein, based on the predetermined flow ratio and an input command from the input device, the boom actuating signal and the tool actuating signal are contemporaneously transmitted by the control unit to maintain an inclination of the tool about a horizontal direction as the boom is moved.

10. The automatic tool tilt command system of claim 9, further comprising the control unit having a load sharing system, wherein the load sharing system is configured to modify the boom actuating signal and the tool actuating signal to not exceed an operational capacity of the hydraulic system.

* * * * *